(12) United States Patent
Dulay et al.

(10) Patent No.: US 7,478,112 B2
(45) Date of Patent: Jan. 13, 2009

(54) METHOD AND APPARATUS FOR INITIALIZING DATA PROPAGATION EXECUTION FOR LARGE DATABASE REPLICATION

(75) Inventors: Leonard R. Dulay, Clayton, NC (US); Paul H. Gruver, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/014,311

(22) Filed: Dec. 16, 2004

(65) Prior Publication Data

US 2006/0136443 A1      Jun. 22, 2006

(51) Int. Cl.
    *G06F 17/30* (2006.01)
(52) U.S. Cl. ............................. 707/200; 707/10; 707/101
(58) Field of Classification Search ................. 707/200, 707/10, 101, 102
    See application file for complete search history.

(56) References Cited

U.S. PATENT DOCUMENTS

| 5,623,599 | A  | * | 4/1997  | Shomler .................... 714/18 |
| 5,884,324 | A  |   | 3/1999  | Cheng et al. |
| 6,167,399 | A  | * | 12/2000 | Hoang ....................... 707/5 |
| 6,438,538 | B1 |   | 8/2002  | Goldring |
| 6,457,109 | B1 | * | 9/2002  | Milillo et al. ............... 711/162 |
| 6,526,418 | B1 |   | 2/2003  | Midgley et al. |
| 6,604,117 | B2 | * | 8/2003  | Lim et al. ................... 707/200 |
| 6,622,152 | B1 | * | 9/2003  | Sinn et al. .................. 707/204 |
| 7,082,446 | B1 | * | 7/2006  | Bottomley .................. 707/204 |
| 2001/0051944 | A1 | * | 12/2001 | Lim et al. ................... 707/4 |
| 2003/0046292 | A1 |   | 3/2003  | Subramanian et al. |
| 2003/0093413 | A1 |   | 5/2003  | Dettinger et al. |
| 2003/0115268 | A1 | * | 6/2003  | Esposito ..................... 709/205 |
| 2003/0135523 | A1 | * | 7/2003  | Brodersen et al. ............ 707/201 |
| 2004/0030703 | A1 | * | 2/2004  | Bourbonnais et al. ......... 707/100 |
| 2004/0158550 | A1 | * | 8/2004  | Jardin ........................ 707/2 |
| 2004/0215656 | A1 | * | 10/2004 | Dill et al. ................... 707/103 R |

* cited by examiner

*Primary Examiner*—Apu Mofiz
*Assistant Examiner*—Hung D Le
(74) *Attorney, Agent, or Firm*—George R. McGuire; Bond Schoeneck & King, PLLC

(57) ABSTRACT

The replication of large amounts of data from a database source to a database target is often prone to failure when the amount of data exceeds the transaction capacity of the database. In other words, if the amount of data transfer during initial start-up fills the transaction log before the database changes are committed, then the transaction does not complete and the changes are rolled back. For a transaction to be completed and database changes to be made permanent, the transaction must be completed in its entirety. A method for initializing data propagation execution for a large data source according to an embodiment of the invention uses standard DBMS copy, rename and log clearing/cleaning utility applications to successfully complete an initial load process so that all necessary initialization fields are primed. The method steps create temporary database table names and structures and execute an initialization/cold start using a single data record to set a synchronization point marker. Upon validation of the single record initialization, the replication of the large data table proceeds in a continue/warm mode from the set synchronization point marker. Executable instruction steps and computer readable media incorporating the executable instruction steps are disclosed.

14 Claims, 7 Drawing Sheets

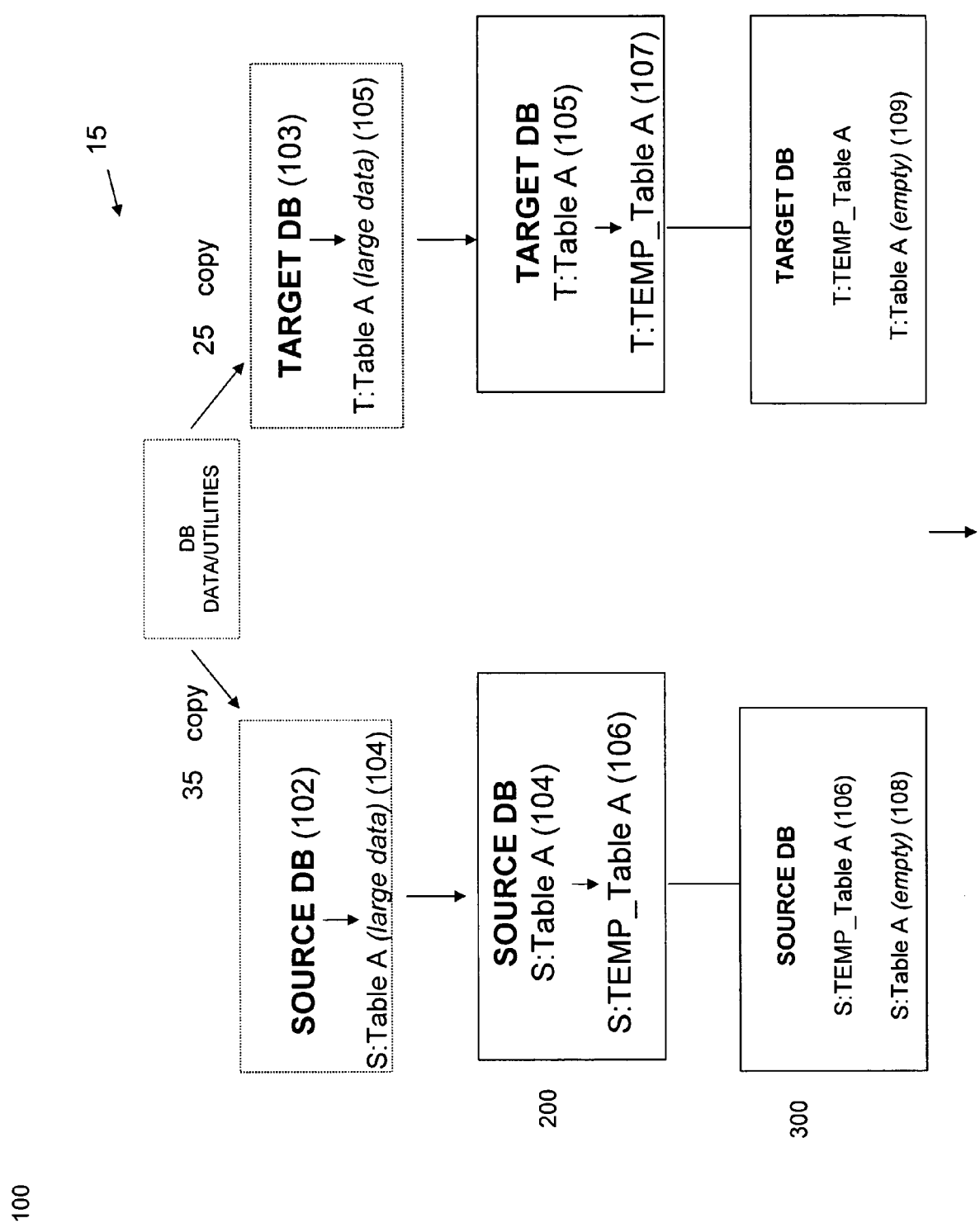

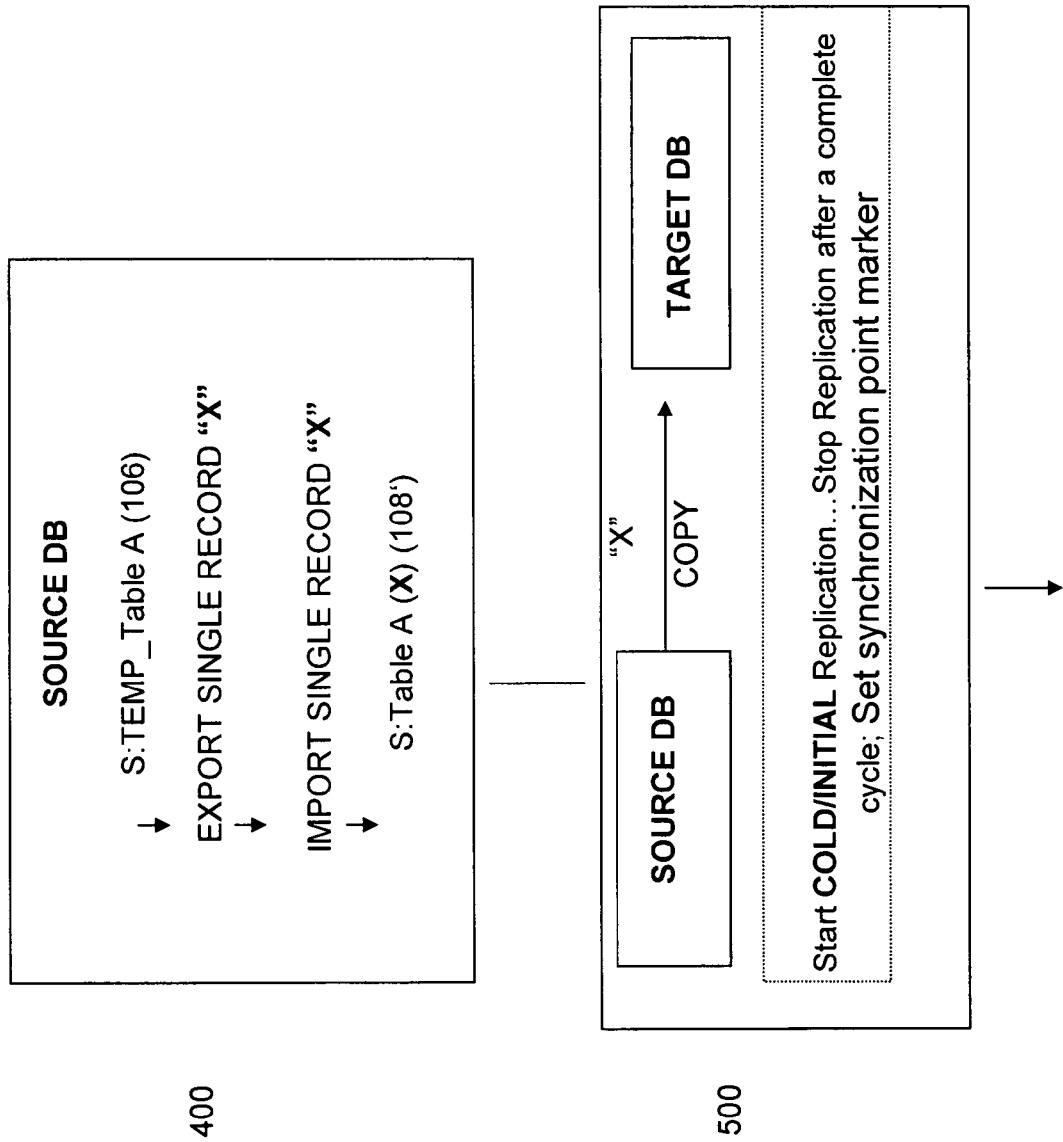
Fig. 2 (con't.)

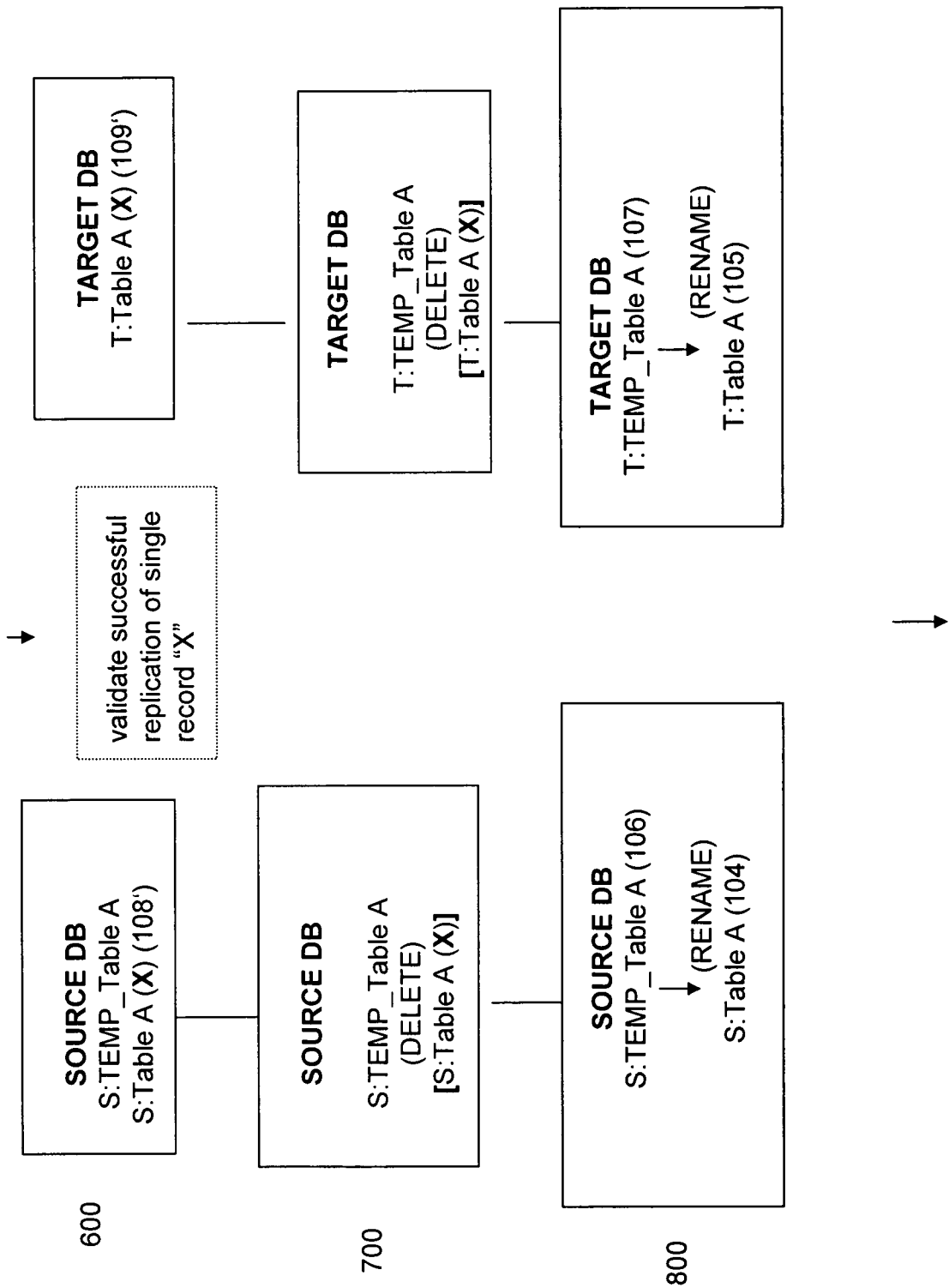
Fig. 2 (con't.)

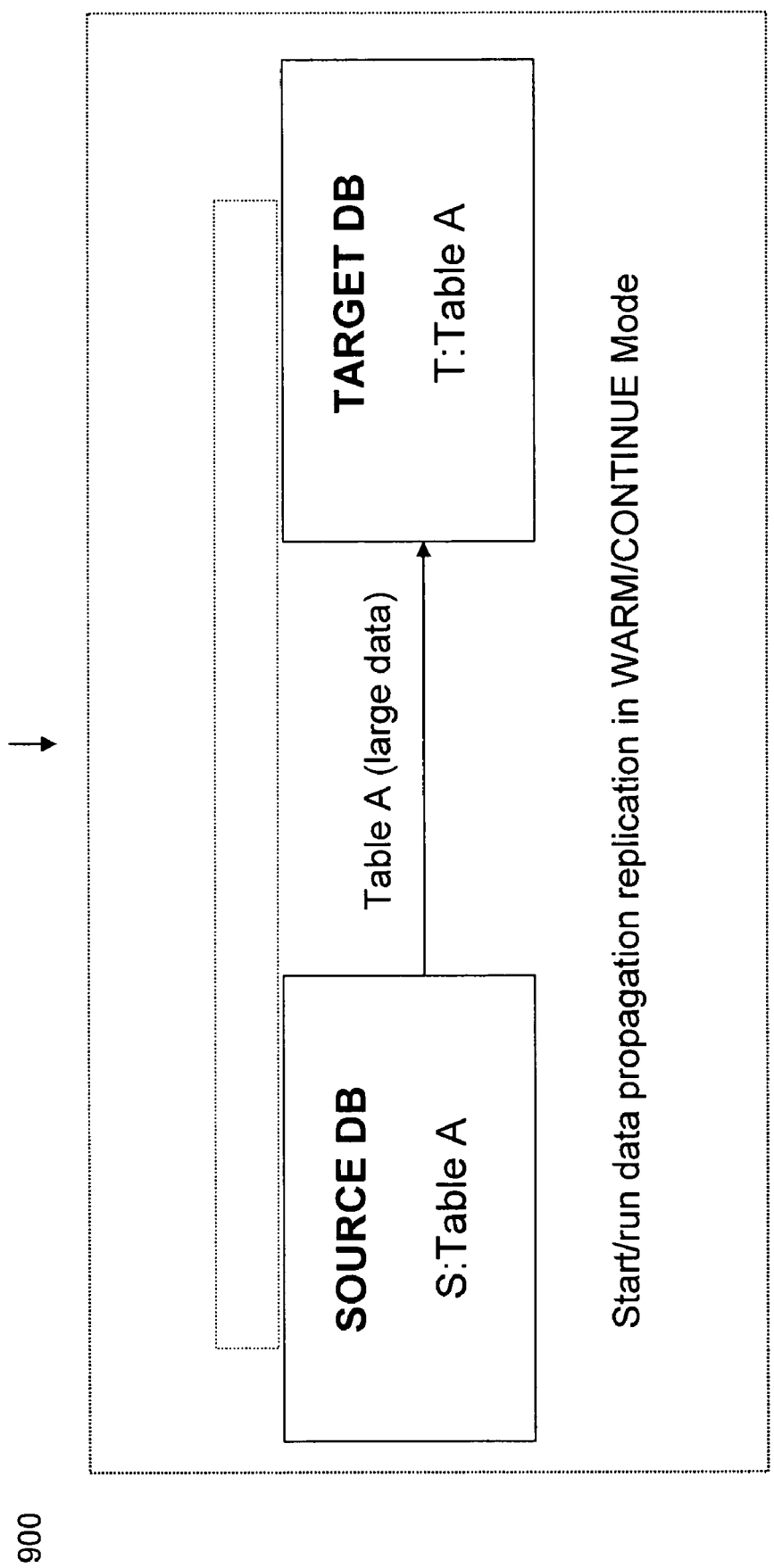
Fig. 2 (con't.)

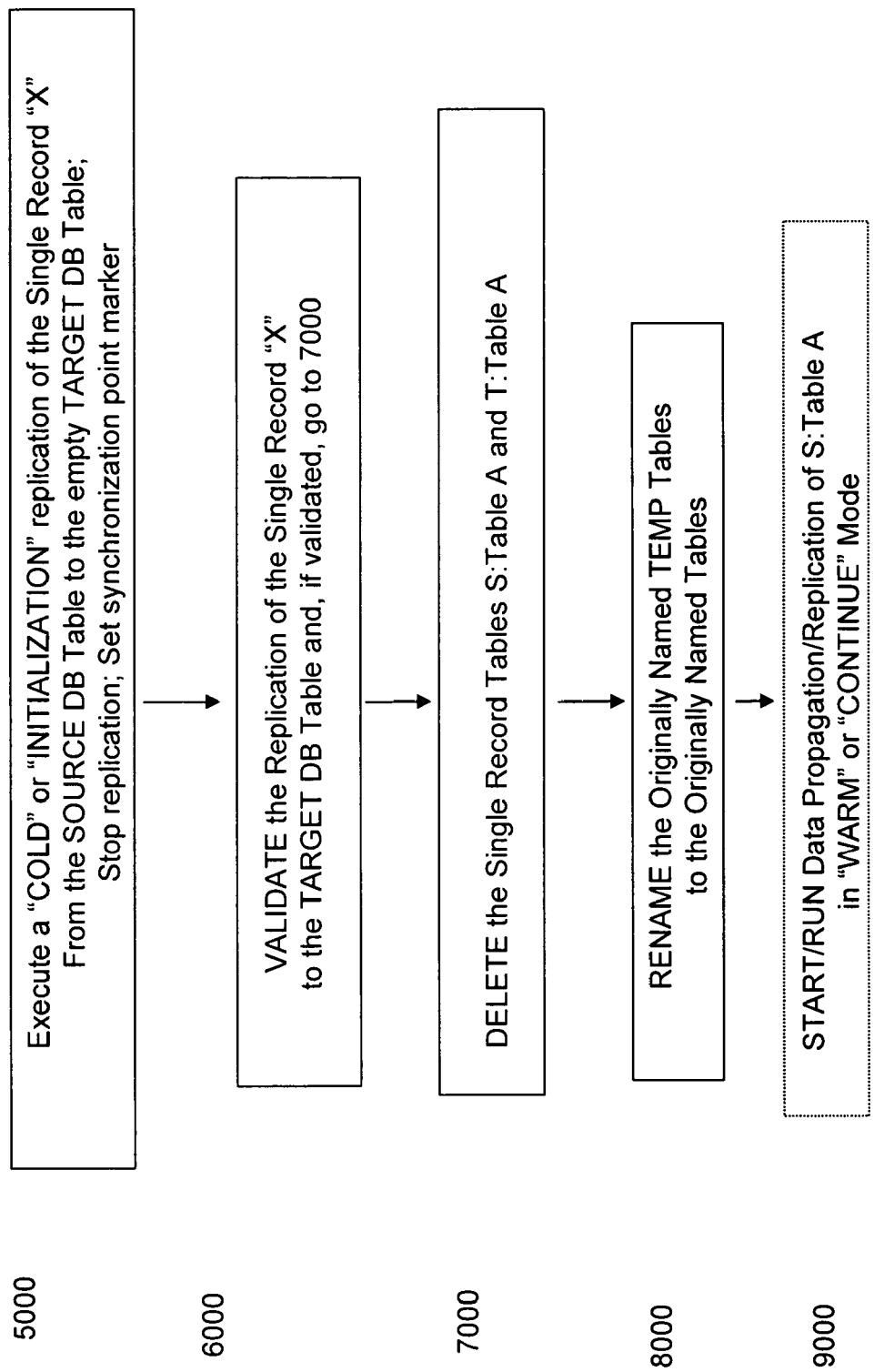
Fig. 3 (con't.)

METHOD AND APPARATUS FOR INITIALIZING DATA PROPAGATION EXECUTION FOR LARGE DATABASE REPLICATION

BACKGROUND OF THE INVENTION

1. Field of the Invention

Embodiments of the invention generally relate to database management and, in particular, to methods, executable instructions and associated computer-readable media, for alleviating failure associated with replication of a large database or a database wherein the data source exceeds a transaction capacity of the database.

2. Description of Related Art

A database (DB) is a computerized information storage and retrieval system. A Relational Database Management System (RDBMS) is a database management system that uses relational techniques for storing and retrieving data. An example of a well known RDBMS is the DB2 family of systems manufactured by IBM. RDBMS software using a Structured Query Language (SQL) interface is also well known in the art. The SQL interface has evolved into a standard language for RDBMS software and has been adopted as such by both the American National Standards Organization (ANSI) and the International Standards Organization (ISO). For further information the interested reader is directed to U.S. Pat. No. 6,622,152, which is hereby incorporated by reference in its entirety to the fullest extent allowed by applicable laws and rules. The interested reader is further directed to the Internet address https://aurora.vcu.edu/db2help/db2a0/form3toc.htm, which presents a detailed Application Development Guide that discusses how to design and code application programs that access DB2 databases, incorporated herein by reference in its entirety.

The DB2 Universal DataBase-Data Propagation/Replication (DB2 UDB dPropR) system provides an application that allows the replication of data from DB2 source databases to DB2 target databases. This application also can be used to replicate data between DB2 and non-IBM source and target databases. The replication of large data loads, e.g., single database tables of about 10 GB or greater, or a database table that exceeds a transaction capacity of the database, can be problematic. This is especially the case at initial start-up, or when refreshing a target table. These operations are referred to herein as a "cold start" operation (i.e., involving the transfer of all data in the database table). In contrast, a "warm start," or a continue-mode transfer operation, refers to data transfer that continues from an identified stop point or synchronization marker, as those terms are understood in the art. Large database replication requires correspondingly large amounts of free (memory) space. For a successful cold start transfer, a target database requires sufficient free tablespace to receive all of the data, plus enough free logspace and enough free tempspace to hold two complete copies of the target database table. Thus the total "free space" required is approximately three times that of the largest anticipated table.

Another challenge relates to the "all or nothing" characteristic of a cold start. A drawback of a cold-start is that either all of the data successfully loads from the source to the target, or the process fails, typically due to a full transaction log. This occurs because the amount of data in the single transfer far exceeds the capacity of the receiving transaction space. In failure mode, the database manager will rollback the table to its original state. As such, the data is never propagated to the target/destination.

Another recognized problem pertains to time lost due to failure of the replication operation. It is often difficult to accurately predict how much free space a large data transfer operation will require. A short estimate may result in the replication operation running for several hours or longer. In failure mode, the process will error-out and run again for several hours in an attempt to recover. This cycle of attempting to replicate and failing may continue indefinitely, resulting in obvious losses.

Furthermore, the database itself may have problems. For example, during the loading of a database all tables sharing the same tablespace are unavailable until the load is completed. Thus the database residing on the target database server may be come unavailable for an extended period of time. Moreover, if the load fails, the tablespace could be left in a 'load-pending' state, jeopardizing the entire database. The loading of large amounts of data also may require temporary customization of the database, which may in turn require that the database or database engine be recycled.

In light of the foregoing recited drawbacks and disadvantages, and others that are appreciated by those skilled in the art, the inventors have recognized the need for a solution that addresses these problems in a consistent, successful manner and with minimal interactions and drawbacks. A solution is embodied by the invention set forth herein.

SUMMARY OF THE INVENTION

Embodiments of the invention relate to methods, executable instructions and related computer-readable media directed to alleviating failure associated with replication of large databases. As used herein, the term "large database" refers to a database table or similar database structure having greater than about 10 GB of data or, alternatively, a data source in which the unit data transfer amount exceeds a transaction capacity of the database.

An embodiment of the invention is directed to a method of initializing data propagation execution for a large data source. In an aspect, an original source database ($DB_S$) table (e.g., S:Table A) that has a table structure, and which contains a large quantity of data, and an original target database ($DB_T$) table (e.g., T:Table A) having a table structure, and which also contains the large quantity of data, have been provided as a starting point. Alternatively, these original source and target database tables can be created by loading a source table and a target table with the large quantity of data. In an aspect, the original source and target database tables can be loaded by using a standard copy data utility application provided by a database management system (DBMS). According to an aspect, the method involves creating a temporary source database table having data and a table structure identical to the data and the table structure of the original source database table and a name different than the original source table name (e.g., S:TEMP_Table A), in the source database, and creating a temporary target database table having data and a table structure identical to the data and the table structure of the original target database table and a name (e.g., T:TEMP_Table A) different than the original target table name, in the target database; creating an empty source table having the structure of the original source database table in the source database and naming the empty source table the original source table name (e.g., S:Table A(empty)), and creating an empty target table having the structure of the original target database table in the target database and naming the empty target table the original target table name (e.g., T:Table A (empty)); moving a single record, X, from the temporary source database table to the empty source table, which is now a single record source table (e.g., S:Table A(X)); starting a cold-start or initialization replication of the single record, X, from the single record source table to the empty target table, which is now a single record target table (e.g., T:Table A(X); stopping the replication process after a complete replication cycle of the single record, X, to set a synchronization point marker for the data transfer; validating the replication of the single data record, X; and renaming the temporary source database table to the original source table name (S:Table A), and renaming the temporary target database table to the original target table name (T:Table A). In an aspect, copying and renaming are done using standard database utility applications including copy data utility applications, import data utility applications, export data utility applications and renaming data utility applications. According to an aspect of the embodiment, one or more of the steps for creating the temporary empty table structures and moving a single record into the empty source table structure involve extracting a table definition of the original table, renaming the original table to a temporary name, and recreating the original table as an empty table using the table definition. In another aspect, one or more of steps for creating the temporary empty table structures and moving a single record into the empty source table structure involve using a standard data format such as Information Exchange Format (.ixf), for example, to export a single record including the table structure from the original table, renaming the original table, and importing the single record including the table structure under the original table name, such that the original table is recreated having only the single record. In another aspect, one or more of steps for creating the temporary empty table structures and moving a single record into the empty source table structure involve making a full copy of the original table, providing a temporary name for the original table, and deleting all but a single record of data in the original table. Other techniques for creating the temporary empty table structures and moving a single record into the empty table structure may be recognized by those persons skilled in the art. Thus the invention is not to be construed as limited to those specific aspects as recited above. In another aspect, the method further comprising deleting the single record source table and the single record target table after validating the replication of the single data record, X. According to another aspect of the embodiment, the method is performed for more than a single large database table replication. According to an aspect of the embodiment, a further step involves running a data propagation/replication application of the large quantity of data in the renamed temporary source database table in a warm/continue mode from the synchronization point marker.

Another embodiment of the invention is directed to a computer- or other device-readable medium, wherein the medium includes an executable instruction, as described in detail below, for initializing data propagation execution for a large data source. In an aspect, the medium is a tangible medium as known in the art. Alternatively, the medium may include an electromagnetic carrier medium as known in the art.

In exemplary aspects according to an embodiment of the invention, an executable instruction for initializing data propagation execution for a large data source, as described in detail below, can take the form of a database utility application, a script-type program, or a compiled program.

The foregoing and other objects, features, and advantages of embodiments of the present invention will be apparent from the following detailed description of the preferred embodiments, which makes reference to several drawing figures

BRIEF DESCRIPTION OF THE DRAWINGS

FIG. 2 is a flow-box diagram of database contents at various steps of a method according to an embodiment of the invention.

DETAILED DESCRIPTION OF A PREFERRED EMBODIMENT OF THE INVENTION

In the following description of the preferred embodiments reference is made to the accompanying drawings which form part thereof, and in which are shown by way of illustration specific embodiments in which the invention may be practiced. It is to be understood that other embodiments may be utilized and structural and functional changes may be made without departing from the scope of the present invention.

For clarity in understanding the invention, the term "large data source" as used herein refers to a unit quantity of data that is greater than about 10 GB or, alternatively, is larger than the transaction capacity of the database, in the form of a database table, for example, that is to be replicated. As noted above, the inventors have recognized that during the initialization phase of a database replication process, also referred to herein as a "cold start," the replication process often fails. For illustration, if a 10 GB data table is attempting to be transacted via replication but the target database transaction log has a 5 GB limit, the large data source will exceed the transaction capacity of the database. An error will be generated upon exceeding the transaction log limit. The transaction will rollback (i.e., fail) rather than commit (i.e. succeed). However, if the transaction log can successfully be initialized, replication in a continue or "warm" mode typically will be successful. The inventors further recognized that replication failures were occurring for a data table containing greater than about 10 GB of data. The invention, however, is not to be considered inapplicable for data quantity units less than 10 GB, as this is not intended to be a bright line cut-off in any sense; rather this lower boundary data amount arose from empirical considerations and therefore should be given considerable tolerance.

Figure 1:
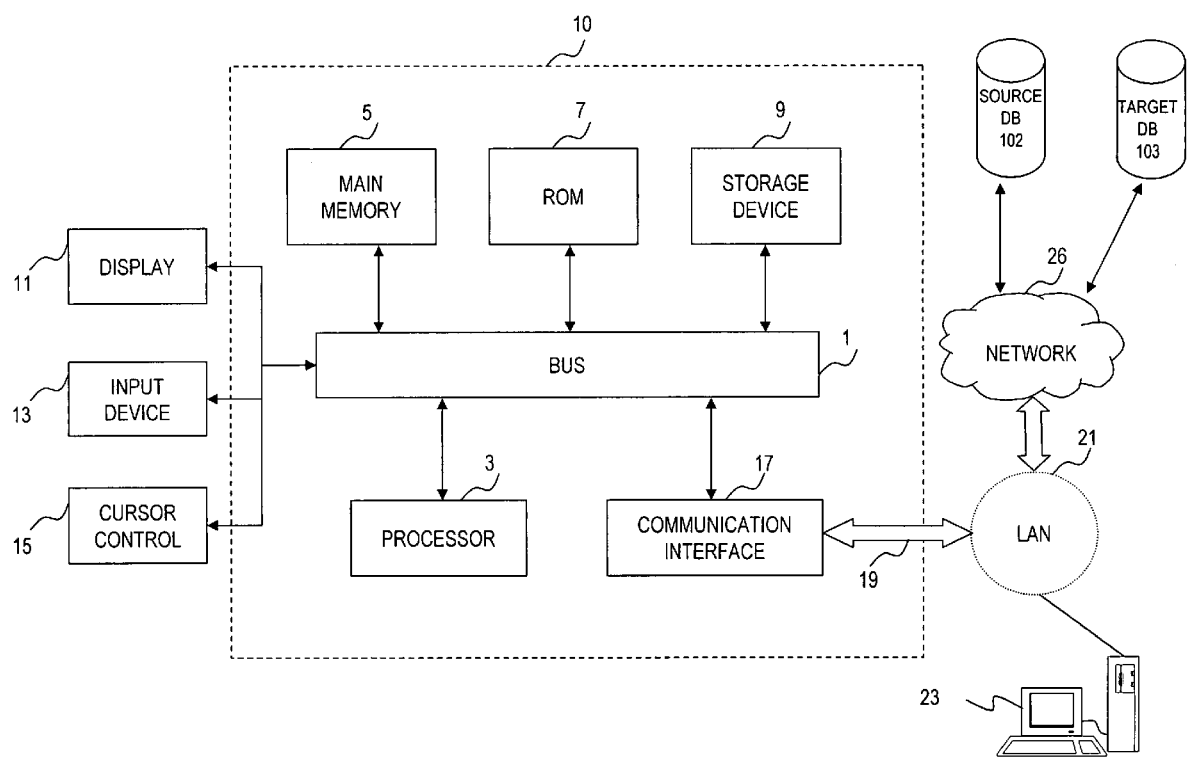
FIG. 1 is a diagrammatic illustration of a computer system in which various embodiments of the invention may operate.

FIG. 1 diagrammatically illustrates an exemplary computer system 10 in which various embodiments according to the invention, described herein below, may operate. The computer system 10 includes a bus 1 or other communication mechanism for communicating information and a processor 3 coupled to the bus for processing information. The computer system also includes main memory 5, such as a random access memory (RAM) or other dynamic storage device, coupled to the bus for storing information and instructions to be executed by the processor. Main memory 5 can also be used for storing temporary variables or other intermediate information during execution of instructions by the processor. The computer system may further include a read only memory (ROM) 7 or other static storage device coupled to the bus for storing static information and instructions for the processor 3. A storage device 9, such as a magnetic disk or optical disk, is coupled to the bus for persistently storing information and instructions.

The computer system may be coupled via the bus 1 to a display 11, such as a cathode ray tube (CRT), liquid crystal display, active matrix display, or plasma display, for example, for displaying information to a computer user. An input device 13, such as a keyboard including alphanumeric and other keys is coupled to the bus for communicating information and command selections to the processor. Another type of user input device is a cursor control 15 such as a mouse, a trackball, or cursor direction keys, for communicating direction information and command selections to the processor and for controlling cursor movement on the display.

Figure 3:
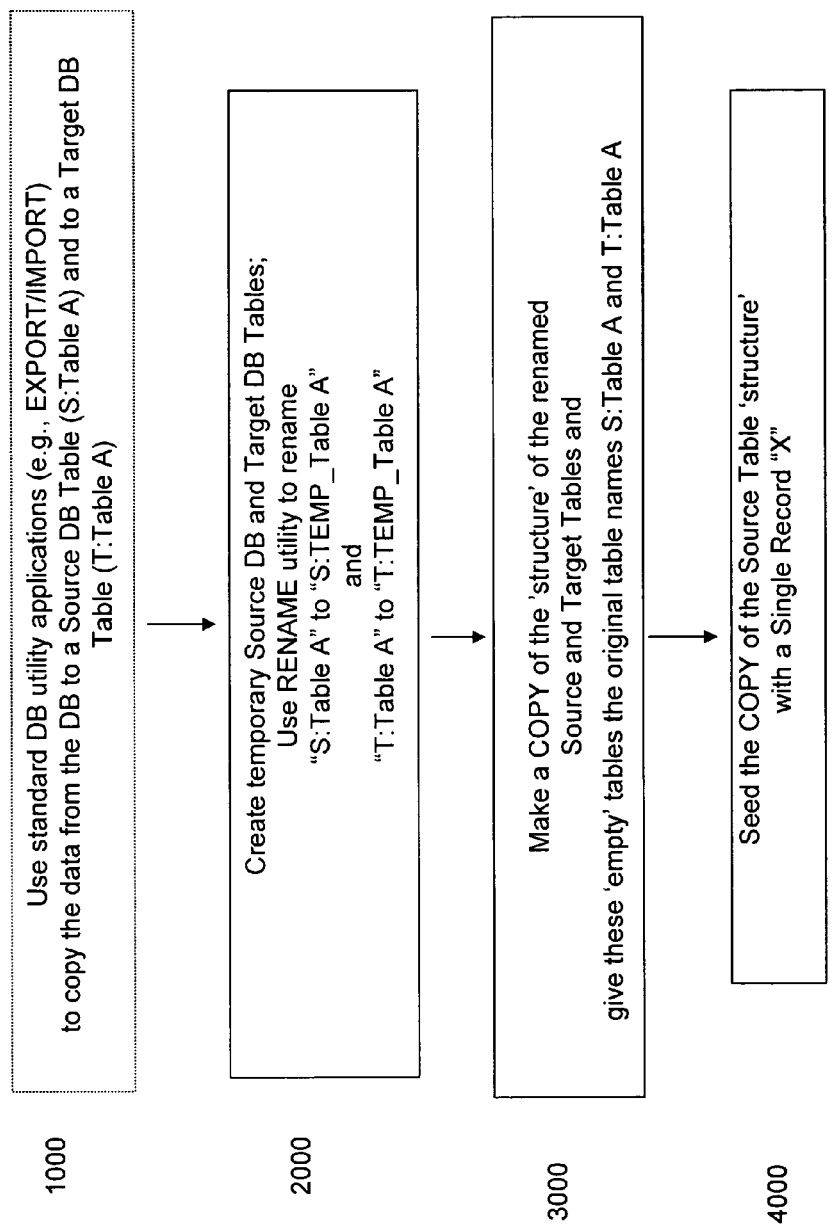
FIG. 3 is a text-box diagram reciting method steps associated with the database illustrations of FIG. 1 according to an embodiment of the invention.

A method embodiment the of the invention as described below in relation to FIGS. 2 and 3 can be performed by the computer system 10 in response to the processor executing an arrangement of instructions contained in main memory. Such instructions can be read into the main memory from another computer-readable medium, such as the storage device 9. Execution of the arrangement of instructions contained in main memory causes the processor 3 to perform the method steps described herein. One or more processors in a multi-processing arrangement may also be employed to execute the instructions contained in main memory 5. In alternative embodiments, hard-wired circuitry may be used in place of or in combination with software instructions to implement an embodiment of the present invention. Thus, embodiments of the present invention are not limited to any specific combination of hardware circuitry and software.

The computer system 10 also includes a communication interface 17 coupled to bus 1. The communication interface 17 provides a two-way data communication coupling to a network link 19 connected to a local network 21. For example, the communication interface may be a digital subscriber line (DSL) card or modem, an integrated services digital network (ISDN) card, a cable modem, a telephone modem, or any other communication interface to provide a data communication connection to a corresponding type of communication line. As another example, communication interface 17 may be a local area network (LAN) card (e.g. for Ethernet™ or an Asynchronous Transfer Model (ATM) network) to provide a data communication connection to a compatible LAN. Wireless links can also be implemented. In any such implementation, communication interface 17 sends and receives electrical, electromagnetic, or optical signals that carry digital data streams representing various types of information. Further, the communication interface can include peripheral interface devices, such as a Universal Serial Bus (USB) interface, a PCMCIA (Personal Computer Memory Card International Association) interface, etc. Although a single communication interface is depicted in FIG. 1, multiple communication interfaces can also be employed.

The network link 19 typically provides data communication through one or more networks 26 to other data devices, such as source database 102 and target database 103. In another example, the network link 19 may provide a connection through local network 21 to a host computer 23, which has connectivity to network 26 (e.g. a wide area network (WAN) or the global packet data communication network now commonly referred to as the "Internet") or to data equipment operated by a service provider. The local network 21 and the network 26 both use electrical, electromagnetic, or optical signals to convey information and instructions. The signals through the various networks and the signals on the network link 19 and through the communication interface 17, which communicate digital data with the computer system 10, are exemplary forms of carrier waves bearing the information and instructions.

The computer system 10 can send messages and receive data, including program code, through the network(s), the network link and the communication interface. In the Internet example, a server (not shown) might transmit requested code belonging to an application program for implementing an embodiment of the present invention through the network, the local network and the communication interface. The processor may execute the transmitted code while being received and/or store the code in the storage device 9, or other nonvolatile storage for later execution. In this manner, the computer system may obtain application code in the form of a carrier wave.

An embodiment of the invention directed to a method 15 of initializing data propagation execution for a large data source will now be described with reference to FIGS. 2 and 3. According to this embodiment, a database 25 has been provided in a DBMS that contains a large quantity of data and standard database management utility applications. The utility applications at least include, for example, copy data (import, export) and rename utilities; cleaning/clearing and other utilities may also be present. As shown in FIG. 2 at step 100, data is copied via a copy utility 35 into a source DB ($DB_S$) 102 and into a target DB ($DB_T$) 103. In an illustrative embodiment, a large data source is copied into a single, original $DB_S$ table 104 referred to as S:Table A and into a corresponding single, original $DB_T$ table 105 referred to as T:Table A. This can typically be accomplished with a standard copy utility application provided in the DBMS. This step is further illustratively set forth with reference to FIG. 3 at 1000. The original tables 104, 105 are characterized by a table structure as will be appreciated by one of skill in the art. In an alternative aspect, the original source and target database tables provided by step 100 (1000) are already present and serve as a starting point of the initialization method embodiment.

At step 200 (2000), once the original source and target database tables are loaded, a temporary source database table S:TEMP_Table A 106 is created in the source database. Temporary table 106 has the same data and table structure as the original source database table S:Table A 104, but is given a different name than the original source table name (e.g., S:TEMP_Table A). Similarly, a temporary target database table T:TEMP_Table A 107 is created in the target database, having the data and the table structure identical to the data and the table structure of the original target database table T:Table A 105, and a different name than the original target table name. Standard copying and renaming utility applications provided in the DBMS can be used as appropriate to accomplish these various functions.

As shown at step 300 (3000), an empty source table S:Table A(empty) 108 is created in the source database. Table 108 has the structure of the original source table 104 and the same name, but contains no data at this point. Similarly, an empty target table T:Table A(empty) 109 is created in the target database. Table 109 has the structure of the original target table 105 and the same name, but also contains no data at this point.

In an aspect indicated at step 400 (4000), a single record, X, is exported from the temporary source database table S:TEMP_Table A 106 and imported into the empty source table S:Table A(empty) 108. Stated differently, empty table 108 is seeded with the single record, X, from temporary source table 106. This may be done with a simple copy utility. Upon transfer of the single record, X, table 108 becomes table 108' and is presented as S:Table A(X).

The step 300 for creating the temporary empty table structures 108, 109 and step 400 for moving the single record into the empty source table structure 108 may be accomplished in a number of different ways. In an exemplary aspect, the table definition (structure) of the original table (S:Table A) 104 in the form of a Data Definition Language (.ddl) application is extracted from the original table. The original table is renamed to a temporary name (S:TEMP_Table A), and the original table 104 is then recreated as an empty table (S:Table A(empty)) 108 using the table definition (i.e., .ddl). In another exemplary aspect, a standard data format such as Information Exchange Format (.ixf) could be used to export a single record including the table structure from the original table, renaming the original table, and importing the single record including the table structure under the original table name, such that the original table is recreated but having only the single record. In still another exemplary aspect, a full copy of the original table could be made, a temporary name could be provided, and all but a single record of data in the original table could be deleted. It will be appreciated by one of skill in the art that other techniques for creating the temporary empty table structures and moving a single record into the empty table structure may be available.

At step 500 (5000), a cold-start or initialization replication of the single record, X, from the single record source table 108' to the empty target table 109 is executed. Empty table 109 now contains the single record, X, and is referred to as T:Table A(X) 109'. When the full replication cycle is completed, the replication process is stopped. This has the effect of setting a synchronization point marker for the data transfer of the single record, X. At this point, the database change is committed. In other words, all necessary initialization fields for replication are now primed. No additional database configuration changes are required for replicating the large amount of data in original S:Table A 104.

Validation of the single record replication occurs at step 600 (6000). Upon validation, the temporary single record source and target database tables 108', 109' can be deleted as shown at step 700 (7000).

The temporary source database table S:TEMP_Table A 106 and the temporary target database table T:TEMP_Table A 107 are renamed to the original source table name (S:Table A) 104 and the original target table name (T:Table A) 105, respectively, at step 800 (8000). In an aspect, copying and renaming are done using appropriate standard database utility applications including copy data utility applications, import data utility applications, export data utility applications and renaming data utility applications. The database is now in a condition to successfully replicate a large database table such as S:Table A 104. This can be accomplished by executing an appropriate replication application, for example, DB2dPropR (IBM), in a continue, or warm, mode from the set point of the synchronization marker described above in regard to step 500, as illustrated at step 900 (9000). The process can be repeated for a plurality of large database tables. Other replication applications/databases containing table renaming and copy utilities, and including transaction log clearing/cleaning capability may also be used as will be appreciated by those in the art.

Another embodiment of the invention is directed to a medium that is readable by a computer or other device, which includes an executable instruction for initializing data propagation execution for a large data source. In an aspect, the executable instruction involves the process steps 200-800 shown in FIG. 2 (and correspondingly, 2000-8000 in FIG. 3) as described in detail above. In various aspects, the executable instruction may be in the form of a database utility application, a script-type program, a compiled program, or other suitable forms known in the art.

The term computer-readable medium as used herein refers to any medium that participates in providing an instruction to a computer processor for execution. Such a medium may take many forms, including but not limited to non-volatile media, volatile media, and transmission media. Non-volatile media include, for example, optical or magnetic disks, such as the storage device 9. Volatile media include dynamic memory, such as main memory 5. Transmission media include coaxial cables, copper wire and fiber optics. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the executable instructions for carrying out at least part of the presently embodied invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by the processor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for initializing data propagation execution for a large data source, comprising:
    a) providing a source database including an original source database table, with the original source database including a large quantity of data and having a table structure and an original source table name, and providing a target database including an original target database table, with the original target database table including t-he a large quantity of data and having a table structure and an original target table name;
    b) creating a temporary source database table having data and a table structure identical to the data and the table structure of the original source database table and a name different than the original source table name, in the source database, and creating a temporary target database table having data and a table structure identical to the data and the table structure of the original target database table and a name different than the original target table name, in the target database, c) creating an empty source table having the structure of the original source database table in the source database and naming said empty source table the original source table name, and creating an empty target table having the structure of the original target database table in the target database and naming said empty target table the original target table name;

d) moving a single record, from the temporary source database table to the empty source table, which is now a single record source table; e) starting a cold-start/initialization replication of the single record, from the single record source table to the empty target table, which is now a single record target table;

f) stopping said replication after a complete replication cycle of the single record, to set a synchronization point marker;

g) validating said replication of the single data record; and h) renaming the temporary source database table to the original source table name, and renaming the temporary target database table to the original target table name.

2. The method of claim 1, further comprising running a data propagation/replication application of the data in the renamed temporary source database table in a warm/continue mode from the synchronization point marker.

3. The method of claim 1, wherein one or more of steps (b-d) comprises extracting a table definition of the original table, renaming the original table to a temporary name, and recreating the original table as an empty table using the table definition.

4. The method of claim 1, wherein one or more of steps (b-d) comprises using a standard data format to export a single record including the table structure from the original table, renaming the original table, and importing the single record including the table structure under the original table name, wherein the original table is recreated having only the single record.

5. The method of claim 1, wherein one or more of steps (b-d) comprises making a full copy of the original table and providing a temporary name and deleting all but a single record of data in the original table.

6. The method of claim 1, further comprising deleting the single record source table and the single record target table after validating said replication of the single data record, X.

7. The method of claim 1, wherein the large data source is equal to or greater than about 10 GB.

8. The method of claim 1, further comprising providing a database management system including at least one of a copy data utility application, an import data utility application, an export data utility application and a renaming utility application.

9. The method of claim 1, wherein the large data source exceeds a transaction capacity of the database.

10. The method of claim 1, further comprising steps (a-h) for a plurality of source and target database tables.

11. A computer readable storage medium including an executable instruction for initializing data propagation execution for a large data source, said executable instruction comprising the steps of:

a) identifying a source database and a target database, b) creating a temporary source database table having data and a table structure identical to a data and a table structure of an original source database table and a name different than a name of the original source table, in the source database, and creating a temporary target database table having data and a table structure identical to a data and a table structure of an original target database table and a name different than a name of the original target table, in the target database, c) creating an empty source table having the structure of the original source database table in the source database and naming said empty source table the original source table name, and creating an empty target table having the structure of the original target database table in the target database and naming said empty target table the original target table name;

d) moving a single record, from the temporary source database table to the empty source table, which is now a single record source table;

e) starting a cold-start/initialization replication of the single record, from the single record source table to the empty target table, which is now a single record target table;

f) stopping said replication after a complete replication cycle of the single record, to set a synchronization point marker;

g) validating said replication of the single data record; and h) renaming the temporary source database table to the original source table name, and renaming the temporary target database table to the original target table name.

12. The computer readable storage medium of claim 11, wherein the instruction is a database utility application.

13. The computer readable storage medium of claim 11, wherein the instruction is a script-type program.

14. The computer readable storage medium of claim 11, wherein the instruction is a compiled program.

* * * * *